April 30, 1957  E. E. HERMAN  2,790,897
FREQUENCY MEASUREMENT CIRCUIT
Filed Jan. 5, 1946
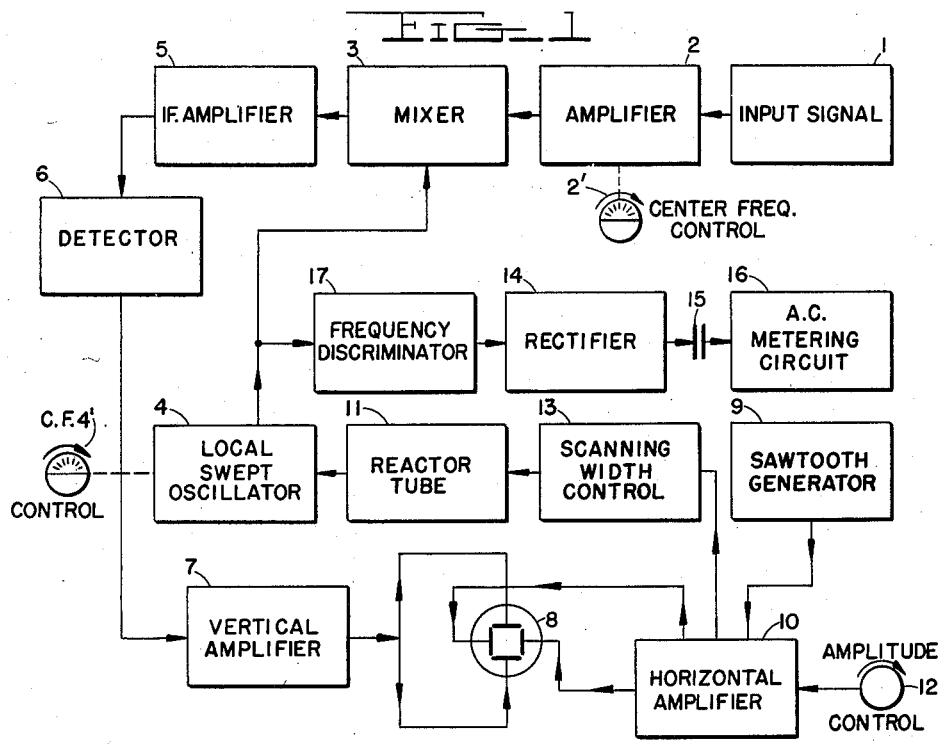
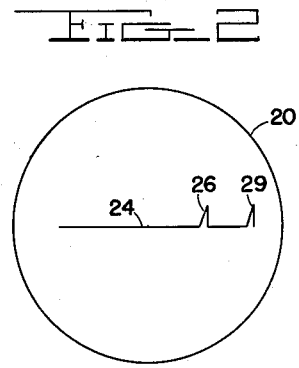
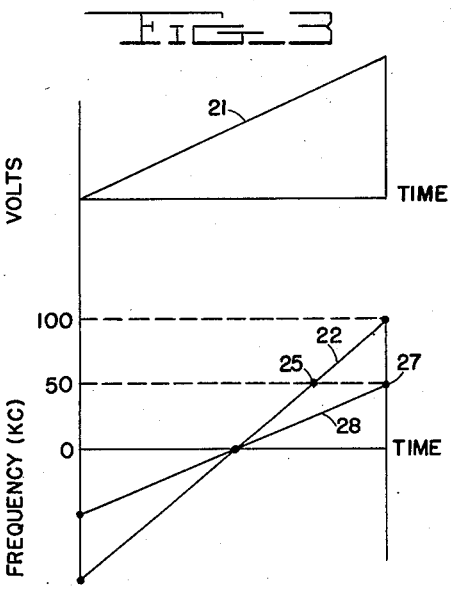
Inventor
ELVIN E. HERMAN

2,790,897
FREQUENCY MEASUREMENT CIRCUIT

Elvin E. Herman, Washington, D. C.

Application January 5, 1946, Serial No. 639,401

4 Claims. (Cl. 250—20)

(Granted under Title 35, U. S. Code (1952), sec. 266)

This invention relates to panoramic or frequency scanning devices, and is particularly directed to a means and method of measuring the frequency deviation from center frequency of a signal indicated on a panoramic device.

In the prior art, the deviation of a signal from center frequency was estimated from its position on a scale marked on the indicator. This gave a fair approximation due to the fact that the frequency of the local oscillator in a superheterodyne type receiver was periodically varied as the beam of the oscilloscope swept across the screen.

The above method however was susceptible to error due to the fact that the variation in frequency was not accurately proportional to the rate at which the beam moved across the screen. Moreover, errors in estimating fractional parts of a scale division were considerable.

In the present invention the frequency range swept by the local oscillator is decreased until one extreme frequency of the local oscillator excursion is beating with the incoming signal. The frequency excursion of the local oscillator is measured by suitable means, and this corresponds to the frequency difference of the signal from center frequency.

It is therefore an object of the invention to provide an improved method of determining the frequency deviation of a signal from center frequency in a frequency scanning device.

It is another object of the invention to provide a method of determining the frequency difference from center frequency of a signal in a panoramic device by indicating the local oscillator frequency beating with the signal.

It is another object of the invention to provide a means of determining the frequency difference of a signal from center frequency in a panoramic device, which is not susceptible to error due to non-linearity of the frequency excursion of the local swept oscillator.

The invention will be further understood with reference to the drawing in which:

Fig. 1 shows in block diagram an exemplary embodiment of the invention in a panoramic receiver, Fig. 2 shows signals appearing on the screen, and Fig. 3 shows graphs of sweep voltage and local oscillator deviation from center frequency.

The operation of the panoramic device will first be explained.

The input signals from source 1 are fed through amplifier 2 to mixer 3. In the mixer, the signals beat with the output of oscillator 4 whose frequency is recurrently varied, ordinarily linearly in proportion to time. The I.-F. output of the mixer then varies with time.

These signals whose time of appearance depends upon frequency are amplified by circuit 5, demodulated by circuit 6, and applied through amplifier 7 to the vertical plates of cathode ray tube 8.

The saw-tooth waveform from generator 9 is fed through amplifier 10 to the horizontal plates of the oscilloscope, in order to cause its electron beam to periodically sweep across the screen with uniform speed. The waveform from the saw-tooth generator, working through amplifier 10, is also used to vary the bias of reactor tube 11. The reactor tube is coupled with the parallel resonant circuit of oscillator 4 in such a manner as to vary the oscillator frequency as the bias on the reactor is changed. Since the output of the saw-tooth generator is used both to vary the frequency of the local oscillator and to move the beam of the oscilloscope horizontally across the screen, signals will appear on the screen in a horizontal position depending on their frequency.

The saw-tooth voltage applied to the reactor tube 11 causes the frequency of oscillator 4 to vary from a frequency below the value it would have with no saw-tooth voltage applied, to a corresponding value above this center frequency. The center frequency of the oscillator is set by control 4'. In certain applications, a center frequency control 2' might be included to tune the amplifier 2 to a corresponding frequency, the center frequency of the amplifier differing from that of the oscillator by an amount equaling the I. F. The controls 2' and 4' may or may not be ganged.

The length of the time base of the C.-R. tube 8 and the frequency range of the swept oscillator 4 can be varied together by changing the gain of amplifier 10 with amplitude control 12. The frequency range of the swept oscillator can be varied independently of the time base of the C. R. T. by the scanning width control 13.

The function of the controls 12 and 13 in Figure 1 will be explained by referring to Figures 2 and 3 in which 20 is the C.-R. screen, 21 is a graph of sweep voltage from amplifier 10 plotted against time, and 22 a graph of local oscillator frequency excursion plotted against time.

Amplitude control 12, Fig. 1, varies the voltage 21, Fig. 3, applied to the horizontal plates of the C. R. T. and hence varies the length of the sweep 24. Since it is applied through units 13 and 11 it also varies the frequency excursion of the local oscillator 4, and hence changes the steepness of curve 22. Control 13 varies the range of the local oscillator excursion independently of the sweep length.

If control 13 is set so that the frequency change of the local oscillator is from 100 kc. below, to 100 kc. above center frequency, a signal 50 kc. off center frequency beats with local oscillator frequency represented by point 25 on curve 22 and appears at point 26 on the C.-R. screen. If the control 13 is adjusted until the local oscillator sweeps from 50 kc. below to 50 kc. above center frequency, the signal will still beat with the same local oscillator signal, which is now represented by point 27 on curve 28.

The signal will now appear at the end of the C.-R. sweep at position 29.

Any signal which apepars at the end of the sweep will be a signal beating with the frequency at the extreme of the local oscillator excursion.

Another way to determine that a signal is beating with the extreme frequency of the local oscillator excursion is to reduce the frequency range with control 13 until the signal starts to drop in amplitude, due to change in the I. F. For, if the extreme frequency of the local oscillator excursion beats with a signal to give the frequency for which the I.-F. amplifier was tuned, a slightly smaller excursion of the local oscillator will produce a signal differing slightly from the proper I. F.

The deviation of a signal from center frequency is then measured by reducing the frequency excursion of the local oscillator until the extreme frequency of the excursion beats with the signal. The frequency excursion of the local oscillator is measured and indicated by units 14, 15, 16 and 17.

The periodically varying frequency signal from the local oscillator is introduced to frequency discriminator circuit 17, whose output amplitude depends upon frequency. The envelope of the discriminator signal is obtained by rectifier 14 and fed to the A.-C. metering circuit 16 through condenser 15. Condenser 15 removes the D.-C. component and the A.-C. metering circuit 16 produces an indication depending on the amplitude of the voltage envelope. It is calibrated to read directly the frequency excursion of the local oscillator, which corresponds to the deviation of the signal from center frequency.

The frequency difference of a signal from center frequency can then be obtained as follows:

Adjust the amplitude control 12 until the sweep almost covers the full width of the screen. Adjust the scanning width control until the signal comes to the end of the sweep or until it begins to fall sharply.

Read the local oscillator frequency excursion on the meter.

If the frequency of the signal is desired it is necessary only to add algebraically the deviation from center frequency to the center frequency. Deviations below center frequency would be considered minus, and those above frequency plus. Various means of indicating the center frequency are already known in the art.

It will be understood that the embodiment shown of the present invention is exemplary only and that the limits thereof are to be determined with reference to the appended claims.

The invention described herein may be manufactured and used by or for the Government of the United States of America for governmental purposes without the payment of any royalties thereon or therefor.

What is claimed is:

1. In a panoramic device, means for measuring the deviation of a signal from center frequency comprising a cathode ray tube having a pair of vertical deflecting plates and a pair of horizontal deflecting plates, means supplying a saw-tooth sweep voltage to the horizontal deflection plates, means varying the amplitude of said sweep voltage, a mixer circuit, means supplying an input signal to the mixer circuit, a local swept oscillator for supplying a continuous signal of periodically varying frequency to the mixer, means for changing the frequency range swept by the local oscillator, I.-F. amplifier and detector means for receiving the signal from the mixer and demodulating it, means for applying the detector output signal to the vertical deflecting plates of the cathode ray tube, a frequency discriminator coupled to the local swept oscillator to supply an output voltage whose amplitude varies with frequency, a rectifier circuit for obtaining the envelope of the discriminator output, and an A.-C. metering circuit calibrated in frequency units for receiving the voltage output of said rectifier circuit.

2. A panoramic receiver comprising, a superheterodyne receiver having a local oscillator and a cathode ray tube for displaying received signals, a sweep generator, means connecting said sweep generator to said cathode ray tube, means for sweeping the local oscillator frequency in accordance with the sweep from said sweep generator, said means for sweeping including sweep width control means, a frequency discriminator connected to said local oscillator, and amplitude measuring means connected to said discriminator.

3. A panoramic receiver comprising, a superheterodyne receiver having a frequency sweeping local oscillator and a cathode ray tube for displaying received signals, a reactance tube connected to said local oscillator for producing the frequency sweeping therein, a sawtooth generator connected to said cathode ray tube, frequency sweep width control means connecting said sawtooth generator connected to said cathode ray tube, frequency sweep width control means connected said sawtooth generator to said reactance tube, a frequency discriminator connected to said local oscillator, and amplitude measuring means connected to said discriminator.

4. A panoramic receiver comprising, a superheterodyne receiver having a frequency sweeping local oscillator and a cathode ray tube for displaying received signals, a reactance tube connected to said local oscillator for producing the frequency sweeping therein, a sawtooth generator, a frequency sweep width control means connected to said reactance tube, a variable gain amplifier connecting said sawtooth generator to said cathode ray tube and said frequency sweep control means, a frequency discriminator connected to said local oscillator, and amplitude measuring means connected to said discriminator.

References Cited in the file of this patent

UNITED STATES PATENTS

| | | |
|---|---|---|
| 2,084,760 | Beverage | June 22, 1937 |
| 2,378,604 | Wallace | June 19, 1945 |
| 2,658,138 | Samuel | Nov. 3, 1953 |

OTHER REFERENCES

Panoramic radio reception, Popkin-Churman, "Radio," March, 1942, pp. 15–18 and 46–49.

Peterson et al.: The precision frequency measuring system etc., Proc. IRE, vol. 20, No. 6, pages 941–956, June 1932